(12) United States Patent
Liu et al.

(10) Patent No.: US 11,436,402 B1
(45) Date of Patent: Sep. 6, 2022

(54) ELECTRONIC DESIGN 3D MIXED PLACEMENT AND UNFOLDING

(71) Applicant: Cadence Design Systems, Inc., San Jose, CA (US)

(72) Inventors: Miao Liu, Shanghai (CN); Liqun Deng, Shanghai (CN); Guozhi Xu, Shanghai (CN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/219,695

(22) Filed: Mar. 31, 2021

(51) Int. Cl.
*G06F 30/392* (2020.01)
*G06F 30/31* (2020.01)
*G06F 119/12* (2020.01)

(52) U.S. Cl.
CPC .......... *G06F 30/392* (2020.01); *G06F 30/31* (2020.01); *G06F 2119/12* (2020.01)

(58) Field of Classification Search
CPC .................................................. G06F 30/392
USPC ............................................................ 716/119
See application file for complete search history.

(56) References Cited

U.S. PATENT DOCUMENTS

| | | | |
|---|---|---|---|
| 8,543,952 B2 | 9/2013 | Kariat et al. | |
| 9,640,279 B1 | 5/2017 | Popps et al. | |
| 9,940,260 B1 | 4/2018 | Hughes et al. | |
| 10,825,745 B1 | 11/2020 | Sinha et al. | |
| 11,120,191 B2 | 9/2021 | Xu et al. | |
| 2012/0110536 A1* | 5/2012 | Agarwal | G06F 30/394 716/129 |
| 2020/0257841 A1 | 8/2020 | Sinha et al. | |

OTHER PUBLICATIONS

Taouil, M., et al., "Exploring Test Opportunities for Memory and Interconnects in 3D Ics," Delft University of Technology, dated 2013.
Von Trapp, F., "Hybrid Bonding: From Concept to Commercialization," InCities, dated Apr. 2, 2018.
Kaibartta, T., et al., "Co-Optimization of TestWrapper Length and TSV for TSV Based 3D SOCs," Journal of Electronic Testing, dated 2020, 36:239-253.
Zhang, H., et al., "Three Dimensional Integrated Circuits," ScienceDirect, dated 2020.

* cited by examiner

*Primary Examiner* — Eric D Lee
(74) *Attorney, Agent, or Firm* — Vista IP Law Group, LLP

(57) ABSTRACT

Disclosed is an improved approach for implementing a three-dimensional integrated circuit design with mixed macro and standard cell placement. This approach concurrently places both the macros and standard cells of the 3D-IC design onto two or more stacked floorplan and optimize the instance locations by timing, density, wire length and floorplan constraint.

20 Claims, 10 Drawing Sheets

ELECTRONIC DESIGN 3D MIXED PLACEMENT AND UNFOLDING

BACKGROUND

A semiconductor integrated circuit (IC) has a large number of electronic components, such as transistors, logic gates, diodes, wires, etc., that are fabricated by forming layers of different materials and of different geometric shapes on various regions of a silicon wafer. The design of an integrated circuit transforms a circuit description into a geometric description called a layout. The process of converting specifications of an integrated circuit into a layout is called the physical design.

Chip designers often use electronic design automation (EDA) software tools to assist in the design process. Chip design using EDA software tools generally involves an iterative process whereby the chip design is gradually perfected. A top-down design methodology is commonly employed using hardware description languages (HDLs), such as Verilog or VHDL for example, by which the designer creates an integrated circuit by hierarchically defining functional components of the circuit, and then decomposing each component into smaller and smaller components.

The various components of an integrated circuit are initially defined by their functional operations and relevant inputs and outputs. From the HDL or other high-level description, the actual logic cell implementation is typically determined by logic synthesis, which converts the functional description of the circuit into a specific circuit implementation. The logic cells are then "placed" (e.g., given specific coordinate locations in the circuit layout) and "routed" (e.g., wired or connected together according to the designer's circuit definitions). The placement and routing software routines generally accept as their input a flattened netlist that has been generated by the logic synthesis process. Various optimizations may then occur to revise the design to improve aspects such as timing performance of the integrated circuit.

Traditionally, the above-described process is performed individually for a single die in a two-dimensional integrated circuit (2D-IC). However, more recent electronic designs now include three-dimensional integrated circuit designs that include multiple dies in a stacked arrangement.

A three-dimensional integrated circuit (3D-IC) refers to integrated circuit device manufactured by stacking multiple dies and connected vertically by TSVs (through silicon vias), bumps, or hybrid-bonding, so that it can achieve higher performance, reduced power and smaller footprint as compared to the conventional two-dimensional integrated circuit.

Although the 3D-IC is a single device from a system point of view, the physical implementation of each die is typically performed separately due to the limitation of mainstream commercial EDA tools. A typical flow of such die-by-die implementation usually starts from the most critical die and with implemented with regards to bumps and TSVs having specific requirement. After one die has its bumps placed and assigned, the bump location information is passed to its neighboring dies. To optimize the bump connection across dies, design iterations are needed to achieve better performance, power and area (PPA) result.

For high performance 3D-ICs whose two neighboring dies have large number of cross-die timing paths, the above-mentioned manual co-design method is far from sufficient to optimize PPAs. This is because when the cross-die timing path is cut into two separate dies, either timing budgeting or modeling is required for each die's optimization to see the delay, transition and the load of the other half of the timing path. In most cases, it is very difficult to make the timing budgeting accurate, as it is essentially a prediction of the path delay before the optimization.

For example, Memory-on-Logic designs implemented as a 3D-IC is one of the challenging applications that is difficult to be implemented with the die-by-die flow. Memory-on-Logic 3D-IC is a type of design having logic cells (registers and combinational logics) and memory hard macros that is characterized by having the memories on one die and the logic cells on the other die. The two dies are stacked as a 3D-IC device, e.g., with hybrid-bonding or equivalent technology connecting them. The implementation challenges not only include the timing budgeting and modeling problem, but also includes the placement of the memory macros, because the placement of the memories need to be optimized according to the placement of the logic cells. In die-by-die flow, each die is implemented separately so they cannot see each other.

Therefore, what is needed is an improved approach to implement electronic designs corresponding to 3D-IC designs, particularly for 3D-IC designs that are implemented as memory-on-logic designs.

SUMMARY

Embodiments of the invention provide an improved method, system, and computer program product to implement 3D-IC electronic designs. Some embodiments of this invention introduce an implementation approach for Memory-on-Logic 3D-IC with mixed placement, two-dimensional unfolding, and shadow bump assignment. The approach concurrently places both the macros and standard cells and optimizes the instance locations by timing, density, wire length, and/or floorplan constraint. The connecting structure (e.g. bumps or hybrid-bondings) between the two dies could be created at the optimal location according to the macro and standard cell placement. With two-dimensional unfolding, timing/power/area optimization, clock tree synthesis and routing can run concurrently on multiple dies without any form of budgeting or die modeling. The approach removes the need of die-by-die iteration and better improve the performance, power and area result of the Memory-on-Logic design.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1A:
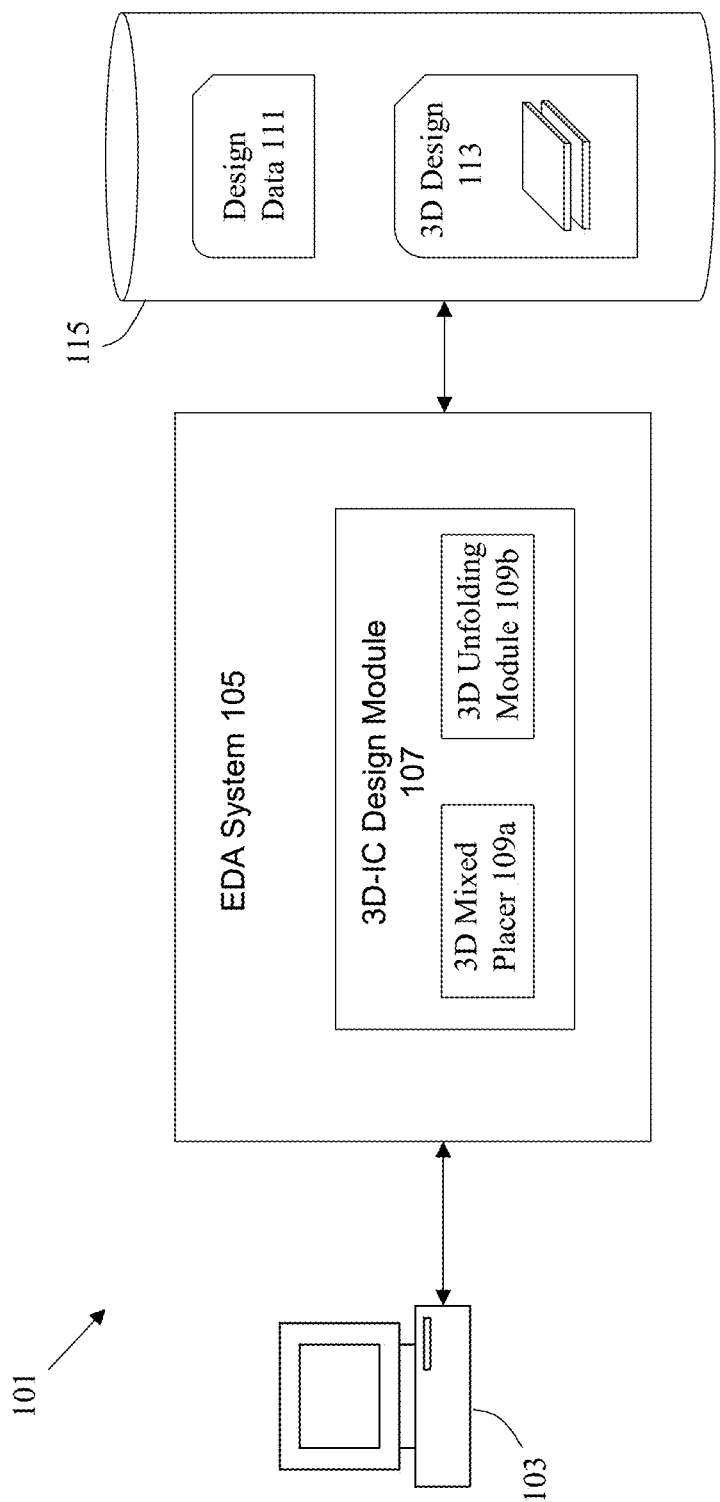
FIG. 1A shows a high level architecture of a system, according to some embodiments, for implementing three-dimensional integrated circuit (3D-IC) designs with two-dimensional unfolding and shadow bump assignment.

FIG. 1A shows a high level architecture of a system 101, according to some embodiments, for implementing three-dimensional integrated circuit (3D-IC) designs with two-dimensional unfolding and shadow bump assignment, particularly in some embodiments for memory-on-logic 3D-IC implementations.

System 101 may include one or more users that interface with and/or operate a computing system to control and/or interact with system 101 using a computing station 103. Such users include, for example, design engineers or verification engineers. The computing system comprises any type of computing station 103 that may be used to operate, interface with, or implement one or more EDA systems/applications 105. Examples of such computing systems include for example, servers, workstations, personal computers, or remote computing terminals connected to a networked or cloud-based computing platform. The computing system may comprise one or more input devices for the user to provide operational control over the activities of the system 101, such as a mouse or keyboard to manipulate a pointing object.

The one or more EDA systems/applications 105 are employed to operate upon design data 111 to generate an optimized 3D-IC design 113. To accomplish this, the EDA system 105 may include multiple processing modules, such as a 3D mixed placer 109a and a 3D unfolding module 109b. The 3D mixed placer 109a is employed to perform placement of the design components onto a floorplan in an upfront manner, where the macros and the standard cells are concurrently placed. As described in more detail below, this results in the generation of a floorplan that generally includes macros on the floorplan of a first die and standard cells on the floorplan of a second die in a vertically stacked arrangement. The approach of having macros on one die and standard cells on another die is a typical situation, where it may also occur under certain conditions that some of the macros and/or standard cells may be placed such that a given die may include both (as described in more detail below). In addition, it is noted that the top die and bottom die may corresponds to different die sizes. After this placement activity has occurred, partitioning of the design into the different dies follows in later steps.

The 3D unfolding module 109b unfolds the vertical stacking of the multiple dies that results from the 3D mixed placement. By unfolding the vertical stacking of the multiple dies, the 3D-IC design is physically partitioned into each die's floorplan according to the die orientation and placement location, and logically partitioned to each die's hierarchical module with feedthrough insertion. Similar to partition pin assignment in 2D hierarchical implementation flows, shadow bumps are assigned on 3D-IC die-to-die interfaces based on the routing topology before unfolding. In favor of the buffering requirement of certain 3D stacking scenario, such like Memory-on-Logic stacking, shadow bump and module port cloning could be performed on the multi-fanout cross-die nets.

With the unfolded design, the IC backend implementation flow such as timing optimization, clock tree synthesis and routing can run concurrently on multiple dies without any form of budgeting or die modeling. The method removes the need of die-by-die iteration and better improves the performance, power and area result of a 3D-IC design. This approach is therefore significantly better than alternative approaches that first partitions the design into multiple dies and then afterwards performs placement after the partitioning, since this alternative approach will not permit concurrent optimization due to the need to address each die on a die-by-die basis.

While not explicitly shown in the figure, it is noted that other EDA tools and modules may also be employed within the scope of the invention, such as a DRC (design rule check) checking tool, timing analysis tool, power planning tools, routing tools, clock management tools, etc. For example, a DRC checking tool can be employed to check for any rules violations that may exist for any of the placement and/or routing configurations generated by a place and route. Design rules are a series of parameters provided by semiconductor manufacturers, specifying geometric and connectivity restrictions to ensure sufficient margins to account for variability in semiconductor manufacturing processes. The DRC checking tool is applied to verify the correctness of any designs, and to identify possible issues that may affect overall yield or reliability for the design. A timing analysis tool may also be provided to analyze the expected timing performance of the electronic design. It is noted that any suitable or useful tool and/or modules may be employed to perform other aspects of EDA processing for the electronic design and as such should be deemed to be included within the scope of EDA system 105. A routing tool can be employed to implement routing structures and/or other wiring structures for the electronic design. The above tools may be utilized on an unfolded design to optimize timing, density, power, wire length, and/or based upon any applicable floorplan constraints.

The data generated by EDA system 101, including for example electronic design data 111 and the 3D design 113, may be stored in a computer readable storage medium 115. The computer readable storage medium 115 includes any combination of hardware and/or software that allows for ready access to the data that is located at the computer readable storage medium 115. For example, computer readable storage medium 115 could be implemented as computer memory and/or hard drive storage operatively managed by an operating system, and/or remote storage in a networked storage device, such as networked attached storage (NAS), storage area network (SAN), or cloud storage. The computer readable storage medium 115 could also be implemented as an electronic database system having storage on persistent and/or non-persistent storage.

Figure 1B:
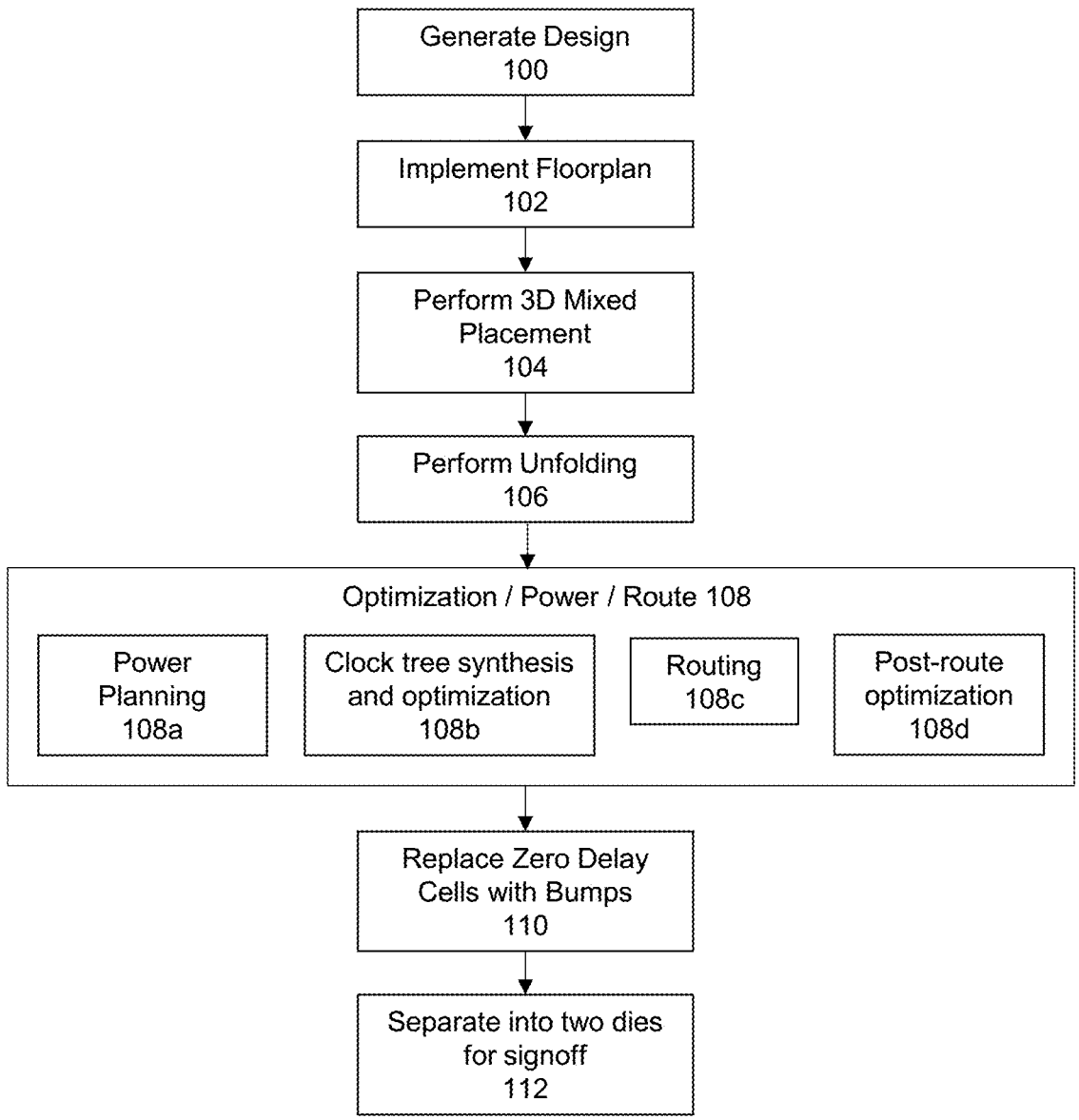
FIG. 1B shows a flowchart of a sequence of actions to implement 3D-IC designs according to some embodiments of the invention.

FIG. 1B shows a flowchart of a sequence of actions to implement 3D-IC designs according to some embodiments of the invention. At 100, the electronic design is generated. Any suitable approach or tool may be employed to generate the electronic design. For example, in some embodiments, a designer may produce a specification of the desired behavior of the circuit design, e.g., using a standard format such as RTL (register transfer level). A synthesis tool may then convert the RTL representation into its representation having design components, e.g., into a design language such as VHDL or Verilog.

At 102, a floorplan is created for the electronic design. To accomplish this, the process starts with the initial netlist, where the size of the floorplan is configured such that in a vertically stacked arrangement of multiple dies (e.g., two stacked dies), the size of the floorplan selected for each die is approximately half of the size of a comparable floorplan if implemented as a 2D design. It is noted that the dies may also corresponds to different die sizes.

Figures 2A, 2B:
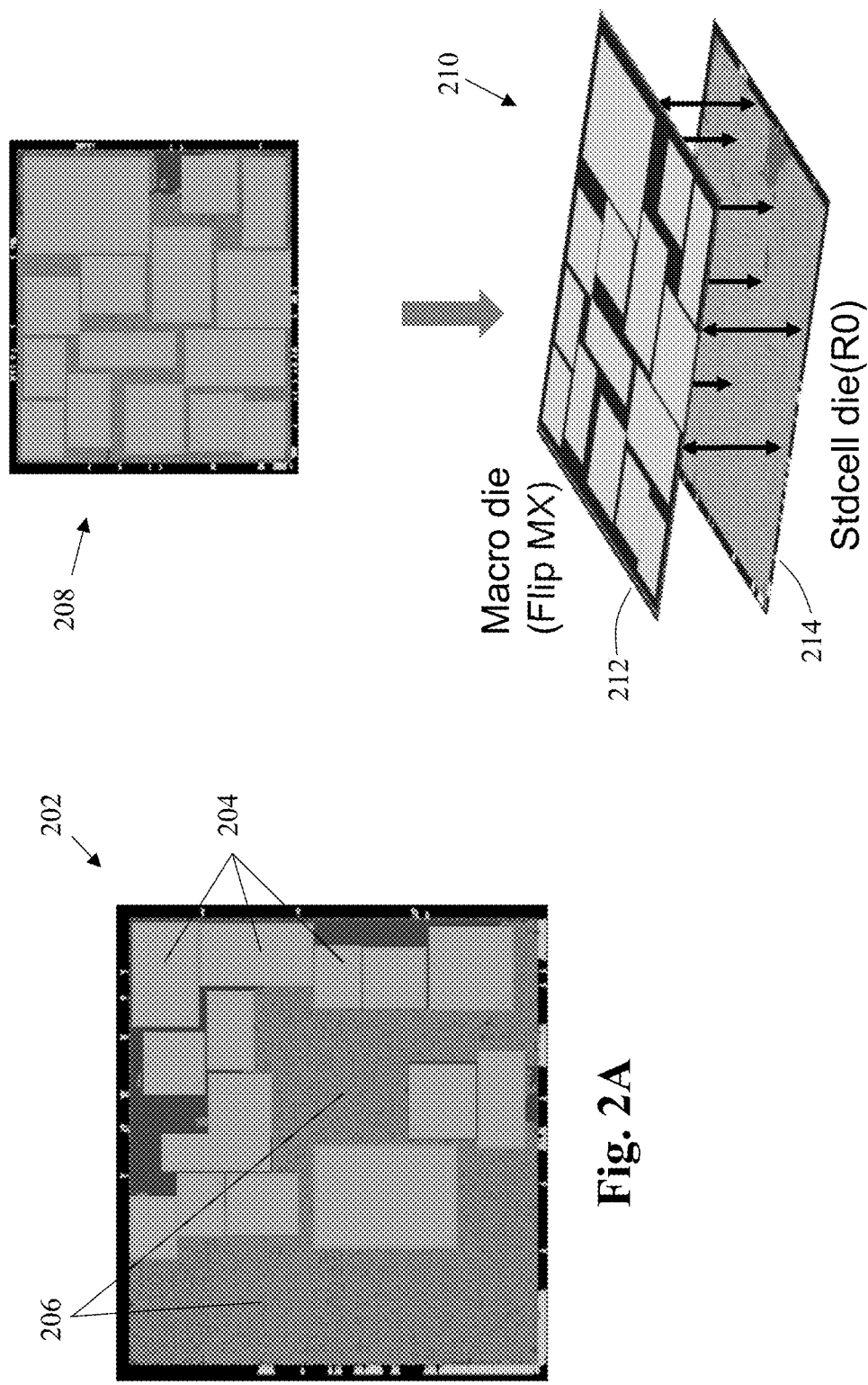
FIG. 2A shows an example floorplan if a 2D floorplan is created for an example 3D-IC.
FIG. 2B shows an example 3D floorplan.

To explain this concept, consider if an electronic design for a memory-on-logic 3D-IC includes a set of macros and standard cells. FIG. 2A shows an example floorplan 202 if a 2D floorplan is created for an example 3D-IC, where the macros 204 and standard cells 206 are all placed onto the same die. If the area/density for that same set of components are planned for two separate dies, then the floorplanning process would end up with much smaller floorplan sizes for the dies. As shown in FIG. 2B, the floorplan area for the 3D floorplan 208 is approximately half the floorplan area for the 2D floorplan 202. While the total area is about the same for both, the size for each die in the 3D design is about half the size of the die in the 2D design.

Returning back to the flowchart of FIG. 1B, the next step at 104 is to perform a 3D mixed placement for the 3D-IC. This action places the design on the floorplan with 3D concurrent macro and standard cell placement (3D mixed placement). In some embodiments, the 3D mixed placer can be implemented as an enhancement to a suitable existing 2D mixed placer by allowing the macro and standard cells be placed on two different planes while still optimizing PPA metrics. This process is illustrated in FIG. 2B, where the 3D mixed placement results in the design shown at 210, where the top die 212 includes the macros and the bottom die 214 includes the standard cells.

It is noted that the density and area of the macros may not exactly match the area/density of the standard cells. As such, it is possible for example, that the macros encompass a greater amount of area as compared to the standard cells, e.g., where the macros encompass 55% of the overall area and the standard cells encompass 45% of the area. Therefore, it is possible that the size allocated to the floorplan for the top die is not enough to hold the required area of the macros, while too much size is allocated for the bottom die that holds the standard cells (or vice versa). There are multiple approaches that can be taken to address this issue if necessary. One possible approach is to increase the size of the floorplan of the die(s) to accommodate the shortfall. Another possible approach in some embodiments is by using the placement process to place some of the macros from the top die onto the bottom die.

In the current embodiment, the 3D mixed placer concurrently places both the macros and standard cells. In addition, in the current embodiment the 3D mixed placer will optimize the instance locations by PPA factors as well. For example, the 3D mixed placer will optimize the instance location according to variables such as timing, density, wire length, and floorplan constraints. Additional actions taken by the 3D mixed placer may include, for example, placement considerations for: (a) TSVs; (b) power/ground structures; (c) ESD cells; (d) testing structures; and/or (e) cells pertaining to 3D manufacturing.

It is noted that although the instances for the macros and standard cells are placed by the 3D mixed placer, they may not be inserted into their absolute final, legalized locations. Instead, incremental placement activities will continue to be performed in subsequent steps, such as downstream unfolding and optimization steps.

At step 106, "unfolding" is applied to the current state of the electronic design. The unfolding step unfolds the vertical stacking of the multiple dies from the results of the 3D mixed placement process. By unfolding the vertical stacking of the multiple dies, the 3D-IC design is physically configured into a 2D representation having each die's floorplan according to the die orientation and placement location, and logically partitioned to each die's hierarchical module with feedthrough insertion.

Figure 3:
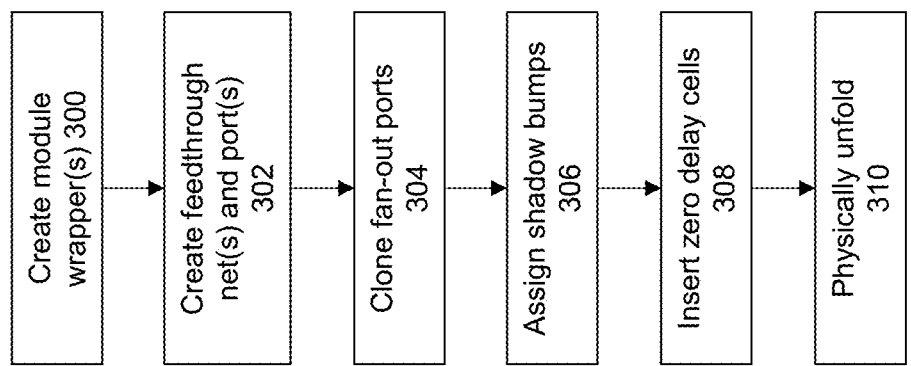
FIG. 3 shows a flowchart of an approach to implement unfolding according to some embodiments of the invention.
Figure 4:
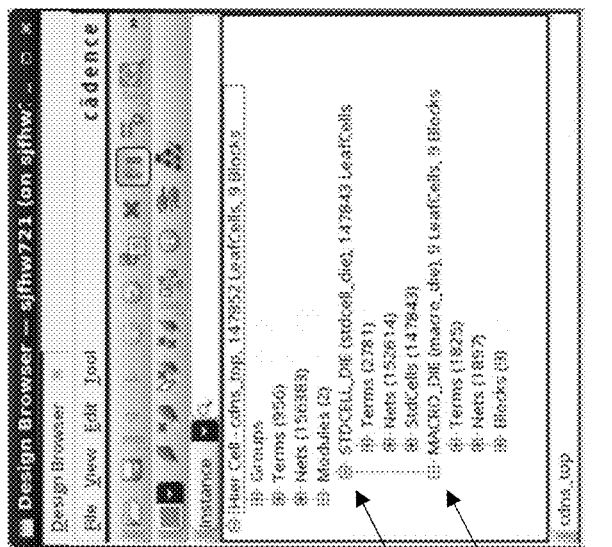
FIG. 4 shows an original netlist that is re-organized by creating two modules to represent separate standard cell and memory dies.
Figure 4:
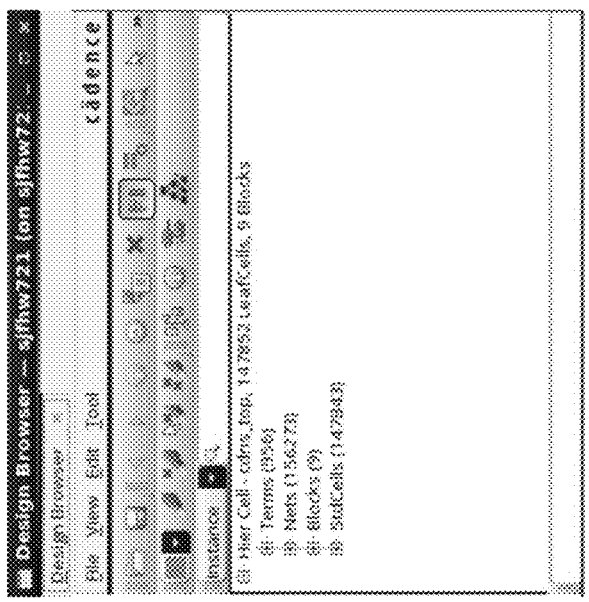

FIG. 3 shows a flowchart of an approach to implement unfolding according to some embodiments of the invention. At 300, module wrappers are created for the memory die and the standard cell die. The general idea is that a netlist hierarchy is created for the memory and logic dies, where as shown in FIG. 4, the original netlist is re-organized by creating modules 402 and 404 to represent the separate standard cell and memory dies, respectively. These wrappers hold the netlist portions that are reorganized into the separate (Verilog) modules. In some embodiments, the approach will put the hard macros into a module 404 referred to herein as "MACRO DIE", and put all standard cells into a module 402 referred to here as "STDCELL DIE". An instGroup can be defined for MACRO DIE, where the rest of the hard macros and standard cells will be put in STDCELL DIE. The primary I/Os can connect to STDCELL DIE.

At step 302, feedthrough nets and ports are created. This action is taken because any net from (or to) the top-level I/Os to/from the macro die must cross the standard cell die. The net will become a "feedthrough" net in the standard cell die.

Figure 5:
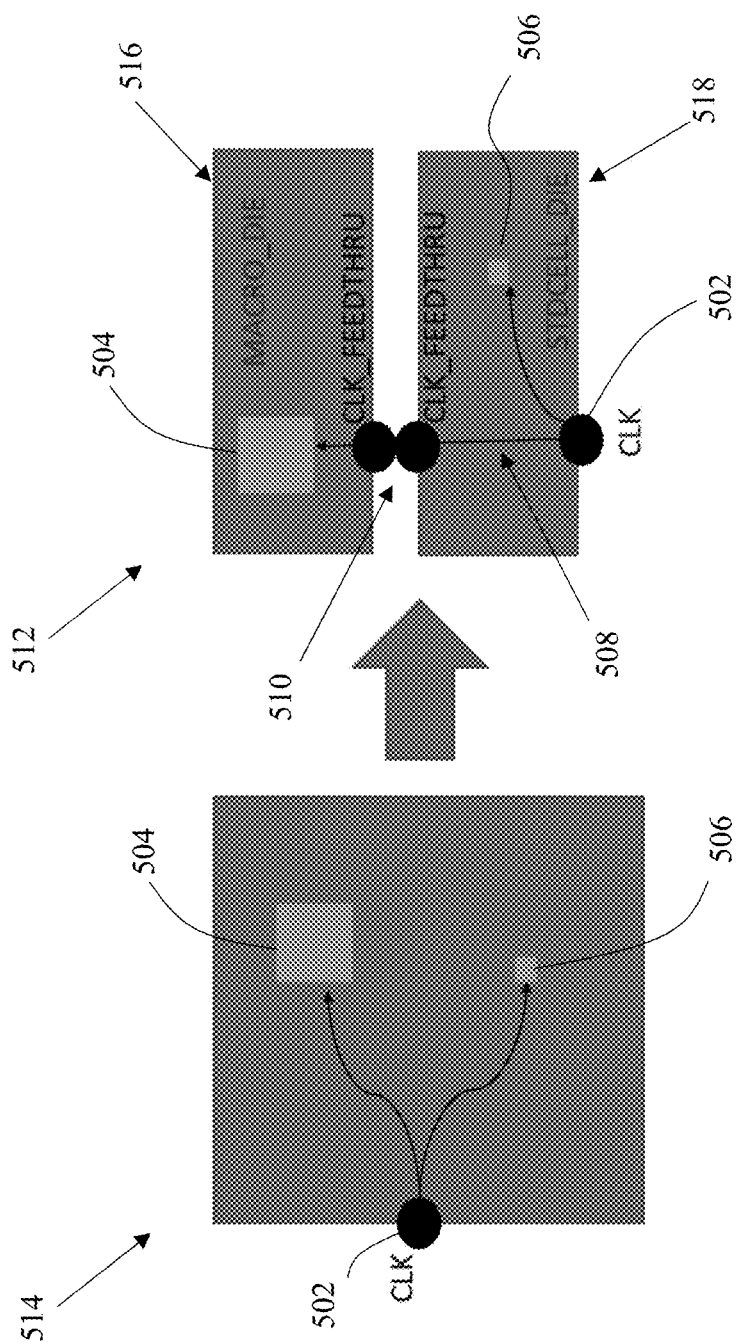
FIG. 5 shows a clock port that goes into a module and which drives both a macro and a standard cell.

To explain, consider the illustration shown in FIG. 5. Here, a top module 514 shows a clock port 502 that goes into a module and which drives both a macro 504 and a standard cell 506. In its 3D implementation 512, there is a module 516 for the macro die and a module 518 for the standard cell die. The clock port 502 is represented in the bottom die 518 for the standard cells. However, the macro 504 is on the top die 516. Therefore, a feedthrough net 508 and ports 510 need to be created, where the clock port 502 connects to the feedthrough net 508 to the ports 510.

At step 304, fan-out ports may be cloned for the design. The issue being addressed is that if a net drives multiple macros, then DRV (design rule violation) fixing may need to be performed in the standard cell die. Thus, the system needs to make sure all the macro die input ports has only one fanout in the macro die.

Figure 6:
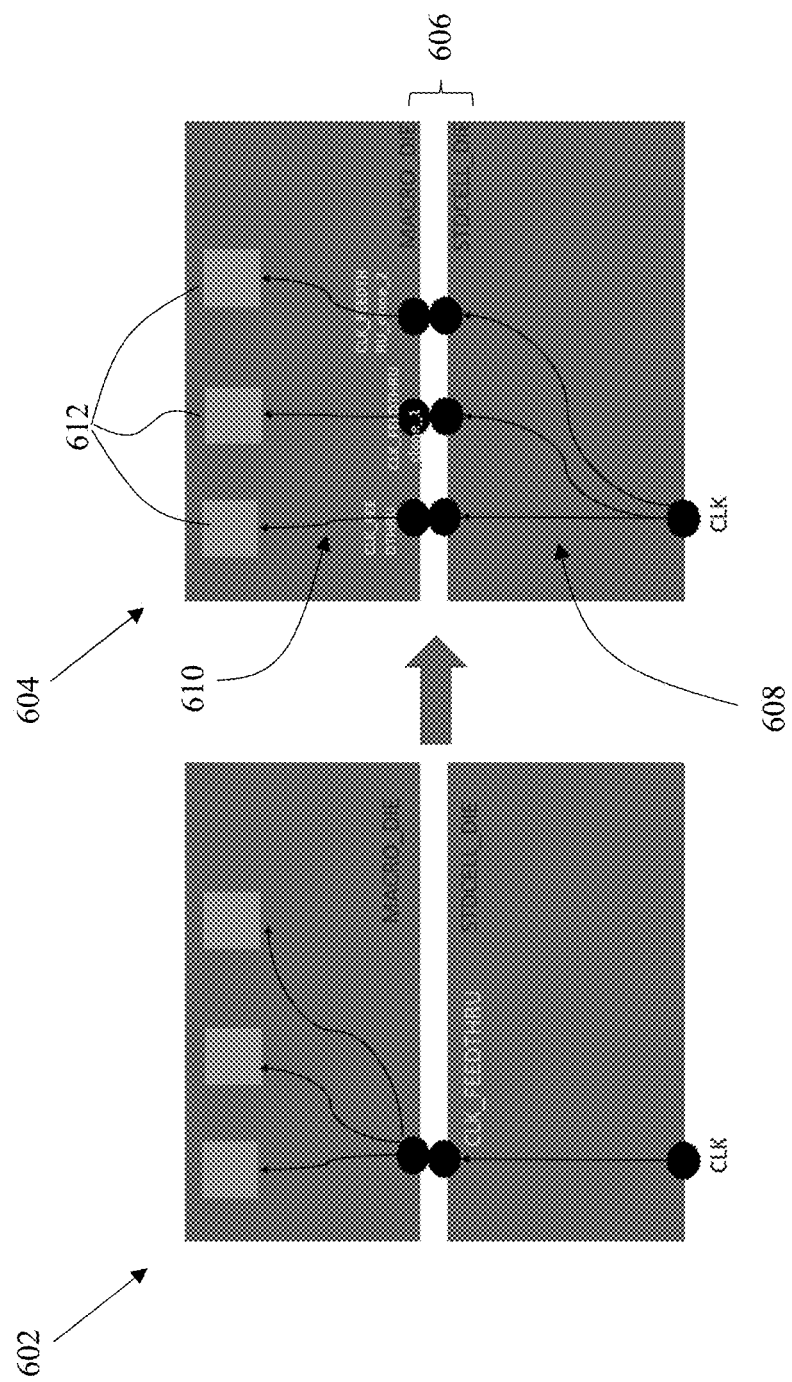
FIG. 6 shows a macro die on top and a standard die on the bottom, where a clock port receives a clock signal that is intended to drive the macros in the top die.

To explain, consider the design portion shown in FIG. 6. Here, design portion 602 shows a macro die on top and a standard die on the bottom, where a clock port receives a clock signal that is intended to drive the macros in the top die. The problem is that if macros occupy most of the placeable area in the top die, it would be very difficult to implement buffering in the top die for the macros.

To address this issue, the multi-fanout net(s) that are included into the top macro die are branched 608 inside the bottom standard cell die to make sure the DRV fixing happen in the standard cell die. Buffers may be included within the nets 608 within the standard cell. Ports 606 may be cloned to connect to the fan-out net 608, where the cloned ports 606 connect to the nets 610 that go to the macros 612.

At 306, "shadow" bumps are assigned in the design. This action includes the assignment of the connecting structures (e.g., bumps) that implement cross-die connections, which in some embodiments are embodied as bumps. It is noted that other connecting technologies may also be used, such as hybrid bonding, and thus this step is also applicable to these other connecting technologies as well. The term "shadow" may be applied to these bumps since they will be represented initially only as locations for the bumps, but will be replaced as real bumps later in the design process.

This action to assign shadow bumps is taken by identifying all bump locations on the floorplan. In some embodiments, the assignment of the shadow bumps is performed by identifying and assigning based upon a shortest location to the pertinent structures to minimize wire lengths, e.g., with shadow bump locations very close to a macro pin.

Figure 7:
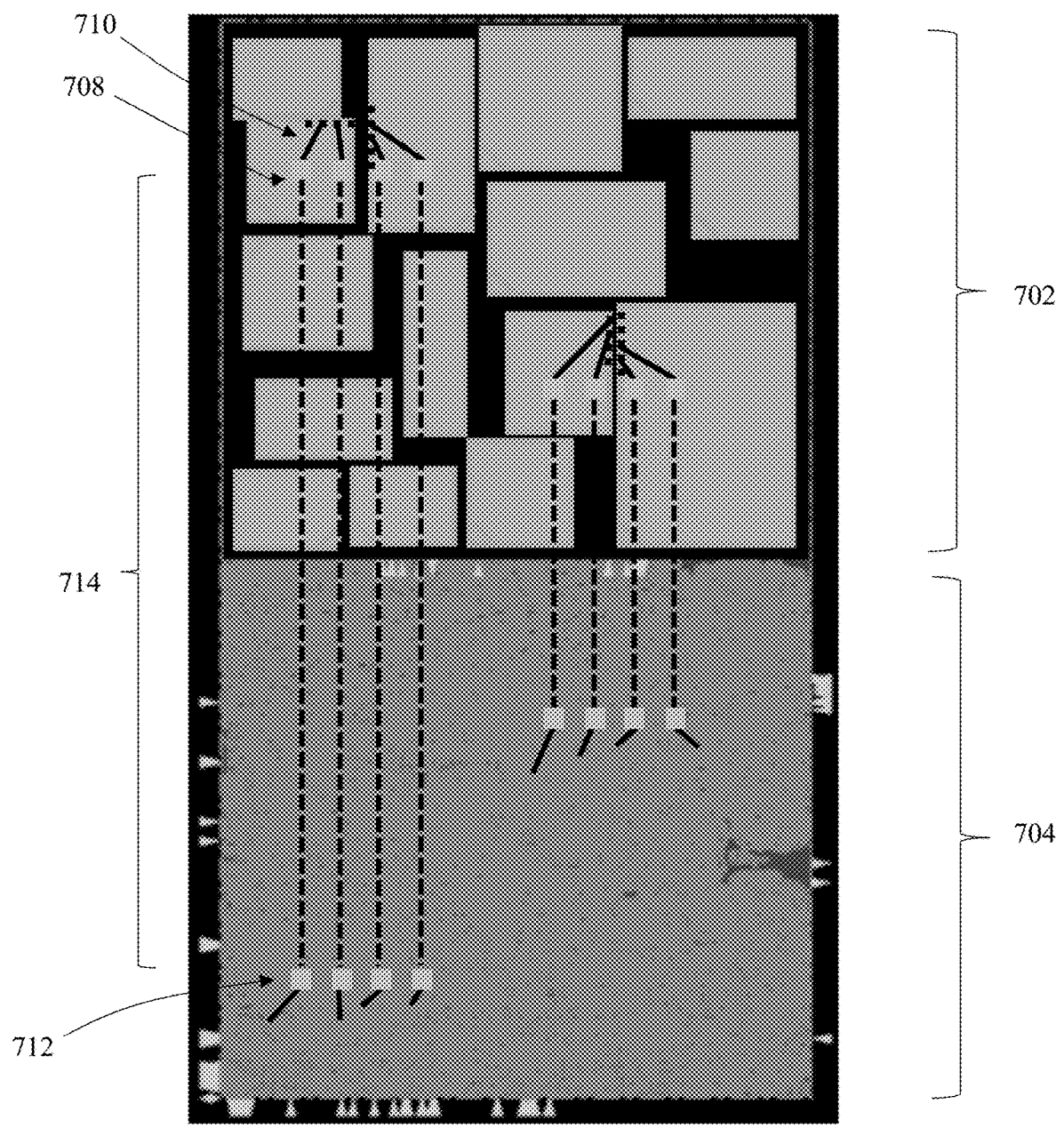
FIG. 7 illustrates bump placement according to some embodiments.

To illustrate these actions, consider the contents of FIG. 7, where a top die is represented as the top portion 702 and the bottom die is represented as a bottom portion 704 of an unfolded layout. A bump 708 may be assigned to a macro pin 710 for a macro on the top macro die. The bump may be placed very close to the macro pin to minimize wire lengths. In a similar manner, a corresponding bump 712 may also be assigned on the bottom die.

It is noted that the bumps may be assigned according to any suitable ordering or prioritization. For example, in some embodiments, some or all of the power and ground bumps may be assigned/reserved first. This can be followed by assignment of bumps for clock nets with the shortest distances. Afterwards, the signal nets can then be assigned.

After the actions of step 306 to assign the shadow bumps, the next step at 308 is to insert zero delay cells based on the shadow bump locations. This action inserts cells that represent a zero delay for timing purposes between sets of related bumps. To explain the reason for this, consider again the pair of bump locations 708 and 712 that have been assigned in the design. In their unfolded representation as shown in FIG. 7, a significant distance 714 exists between these two bump locations when shown as a 2D representation. However, in the final manufactured product, these two dies will be separated and stacked next to each other in a 3D orientation, thus having a very minimal distance between the top bump and the bottom bump. When timing analysis is performed on the 2D representation having distance 714 between the bump locations, this means that a significant delay may be inappropriately modelled between the two bumps.

To correct this problem, settings may be applied to the inter-die net between the shadow bumps. The settings will identify a zero delay parameter that is associated with the inter-die nets. In addition, routing may be skipped for the inter-die nets embodied as the shadow bumps. In some implementations, the zero delay cells may appear like a buffer representation having zero delays. Thus, a set of buffers may be inserted on each cross-die net, where the standard cell die connects to a first buffer and the macro die connects to a second buffer.

Figure 8:
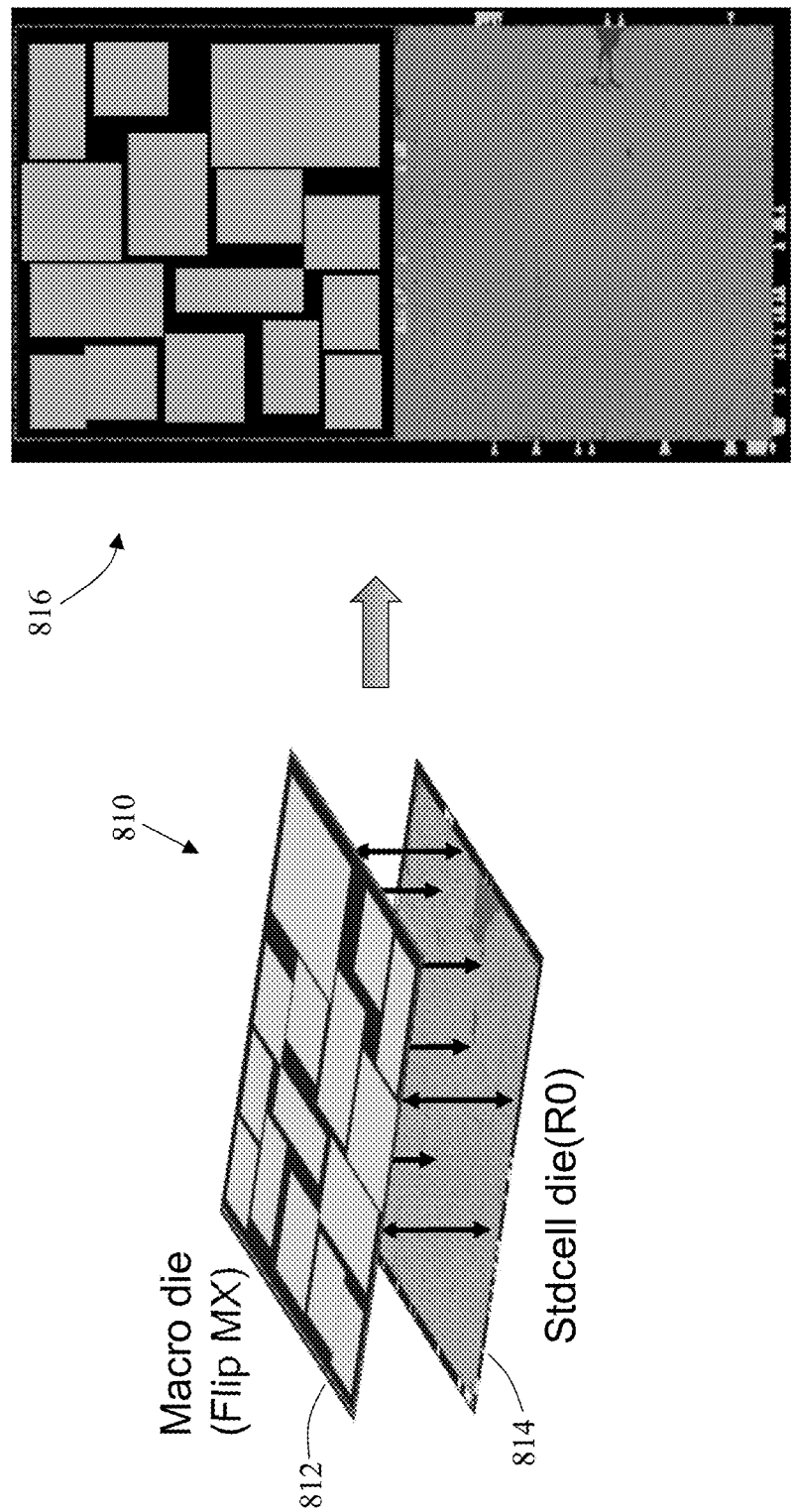
FIG. 8 illustrates physical unfolding according to some embodiments.

At 310, the next step is to physically unfold the design. As illustrated in FIG. 8, this action takes the stacked floorplan 810, and resizes the floorplan into the unfolded floorplan 816. The resized floorplan 816 is resized by twice the area vertically (e.g., if the top and bottom dies are the same size). In effect, the unfolding will occur by unfolding the top die from overlapping the bottom die to the upper half of the new floorplan.

It is noted that with face-to-face designs, the dies will also be mirrored. For example, the mirroring may occur along the X-axis. Therefore, the tool will mirror the location and flip MX each individual instance and ZDC (zero delay cells) accordingly because the top die is facing down. For face-to-back designs, no mirroring may need to occur (although other actions such as insertion of TSVs may need to occur).

Returning back to FIG. 1B, the next action after unfolding at step 106 is to perform various other design activities at step 108, e.g., pertaining to optimization, power implementations, and routing. Any suitable set of activities may occur in this step. For example, at 108a, power planning is performed for the design. At 108b, clock tree synthesis (CTS) and optimization (e.g., pre-CTS and post-CTS optimizations) may be performed. At 108c routing is performed for the design. This step may be followed by post-route optimizations at 108d. Timing analysis and timing optimizations may also occur at step 108. It is noted that modeling these activities can be implemented in the current embodiment by modelling across dies (e.g., vertical RC parasitic, timing, density, wire length and congestion costs across dies), since they are operating on an unfolded design represented in 2D having both dies in the unfolded representation.

As such, this approach permits optimization to occur very efficiently and effectively, without requiring separate modeling (as would be required in a die-by-die approach where a model exists for each die), and produce more accurate and effective results since both dies are concurrently optimized and designed on the same 2D unfolded representation—rather than optimizing each die separately without the need for budgeting, user interactive or scripting iteration between dies as would occur in a die-by-die approach.

At step 110, the zero delay cells are replaced by actual bumps. This action is performed after the timing analysis and any timing-related corrections have been implemented.

At step 112, the design is divided into two separate dies for signoff. This action breaks up the representation into two separate dies that can be manufactured separately.

Therefore, what has been described is an improved approach for implementing a three-dimensional integrated circuit design with mixed macro and standard cell placement. This approach concurrently places both the macros and standard cells of the 3D-IC design onto two or more stacked floorplan and optimizes the instance locations by timing, density, wire length, and floorplan constraint. By allowing instance overlapping on the stacked dies and modeling the vertical RC parasitic, timing, density, wire length and congestion cost across dies, the macros and standard cells on the multiple dies can be placed concurrently to achieve PPA (performance, power, area) optimized placement locations analytically without any form of budgeting or user interactive or scripting iteration between dies.

System Architecture Overview

Figure 9:
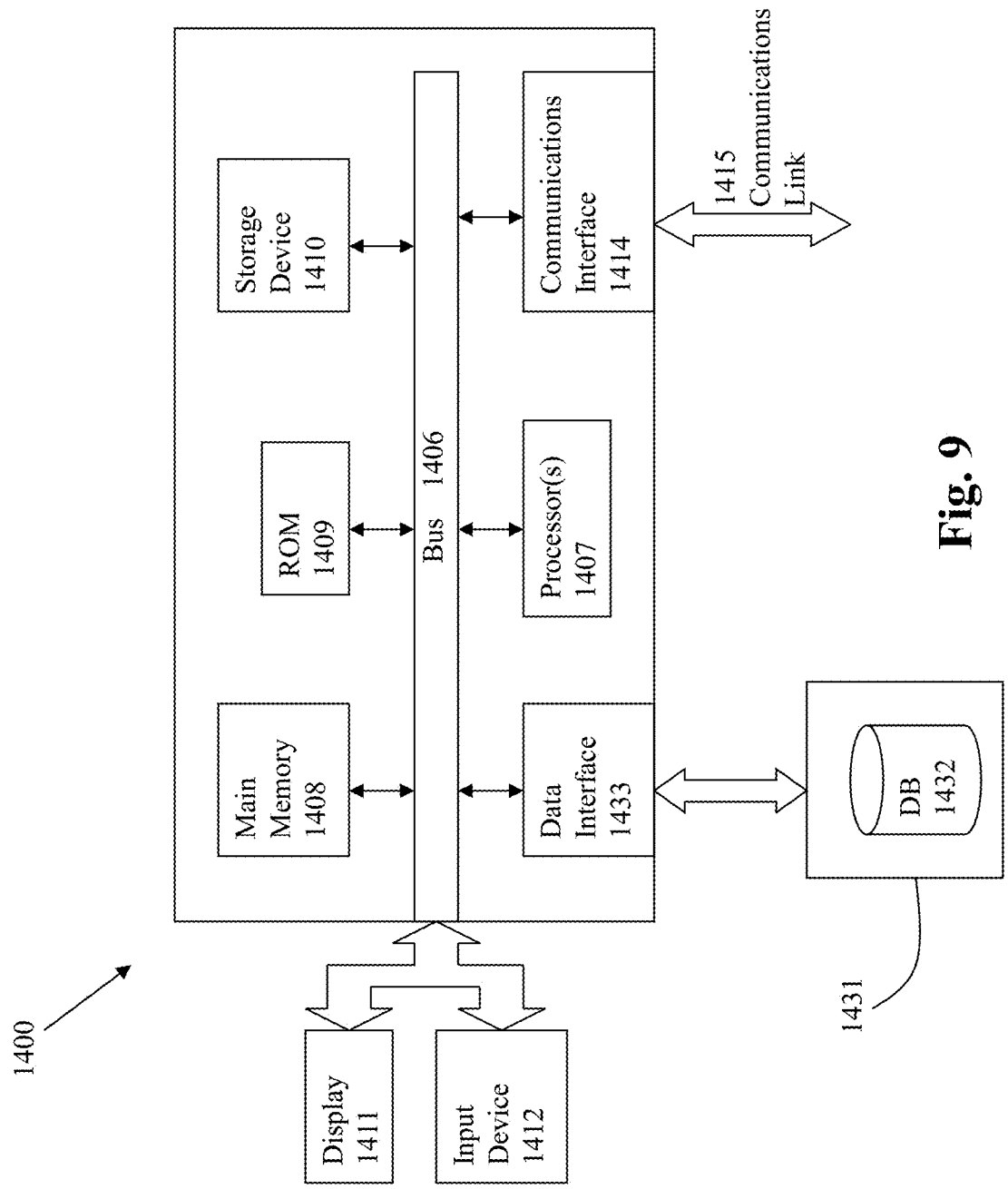
FIG. 9 is a block diagram of an illustrative computing system suitable for implementing an embodiment of the present invention.

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
generating an electronic design for a three-dimensional integrated circuit (3D-IC);
performing three-dimensional (3D) mixed placement for the electronic design to generate a 3D placed design;
unfolding the 3D placed design to create an unfolded design having a two-dimensional (2D) representation;
performing integrated circuit (IQ backend implementation on the unfolded design having the 2D representation; and
separating the 2D representation into multiple die representations.

2. The method of claim 1, wherein unfolding the 3D placed design to create the unfolded design having the 2D representation comprises:
creating feedthrough nets and ports on the 3D placed design;
cloning fan-out ports;
assigning shadow bumps; and
physically unfolding the 3D placed design.

3. The method of claim 1, wherein zero delay cells are inserted in place of shadow bump locations during unfolding, and the zero delay cells are replaced with bumps after timing optimization.

4. The method of claim 1, wherein the 3D mixed placement is performed before partitioning the 2D representation into the multiple die representations.

5. The method of claim 1, wherein the IC backend implementation comprises one or more of timing optimization, clock tree synthesis, power planning, or routing.

6. The method of claim 1, wherein the IC backend implementation performs electronic design optimizations concurrently on structures across the multiple die representations.

7. The method of claim 1, where the multiple die representations comprise a top die having macros and a bottom die comprising standard cells.

8. A computer program product embodied on a non-transitory computer readable medium, the non-transitory computer readable medium having stored thereon a sequence of instructions which, when executed by a processor, causes a set of acts comprising:
generating an electronic design for a three-dimensional integrated circuit (3D-IC);
performing three-dimensional (3D) mixed placement for the electronic design to generate a 3D placed design;
unfolding the 3D placed design to create an unfolded design having a two-dimensional (2D) representation;

performing integrated circuit (IC) backend implementation on the unfolded design having the 2D representation; and separating the 2D representation into multiple die representations.

9. The computer program product of claim 8, wherein unfolding the 3D placed design to create the unfolded design having the 2D representation is performed at least by:
creating feedthrough nets and ports on the 3D placed design;
cloning fan-out ports;
assigning shadow bumps; and
physically unfolding the 3D placed design.

10. The computer program product of claim 8, wherein zero delay cells are inserted in place of shadow bump locations during unfolding, and the zero delay cells are replaced with bumps after timing optimization.

11. The computer program product of claim 8, wherein the 3D mixed placement is performed before partitioning the 2D representation into the multiple die representations.

12. The computer program product of claim 8, wherein the IC backend implementation comprises one or more of timing optimization, clock tree synthesis, power planning, or routing.

13. The computer program product of claim 8, wherein the IC backend implementation performs electronic design optimizations concurrently on structures across the multiple die representations.

14. The computer program product of claim 8, where the multiple die representations comprise a top die having macros and a bottom die comprising standard cells.

15. A system, comprising:
a processor;
a memory for holding a set of instructions and
wherein the set of instructions are executable by the processor to cause a set of acts comprising: generating an electronic design for a three-dimensional integrated circuit (3D-IC); performing three-dimensional (3D) mixed placement for the electronic design to generate a 3D placed design; unfolding the 3D placed design to create an unfolded design having a two-dimensional (2D) representation; performing integrated circuit (IQ) backend implementation on the unfolded design having the 2D representation; and separating the 2D representation into multiple die representations.

16. The system of claim 15, wherein unfolding the 3D placed design to create the unfolded design having the 2D representation is performed at least by:
creating feedthrough nets and ports on the 3D placed design;
cloning fan-out ports;
assigning shadow bumps; and
physically unfolding the 3D placed design.

17. The system of claim 15, wherein zero delay cells are inserted in place of shadow bump locations during unfolding, and the zero delay cells are replaced with bumps after timing optimization.

18. The system of claim 15, wherein the 3D mixed placement is performed before partitioning the 2D representation into the multiple die representations.

19. The system of claim 15, wherein the IC backend implementation comprises one or more of timing optimization, clock tree synthesis, power planning, or routing.

20. The system of claim 15, wherein the IC backend implementation performs electronic design optimizations concurrently on structures across the multiple die representations.

* * * * *